(12) United States Patent
Sheretov et al.

(10) Patent No.: US 10,798,127 B2
(45) Date of Patent: *Oct. 6, 2020

(54) ENHANCED DOCUMENT AND EVENT MIRRORING FOR ACCESSING INTERNET CONTENT

(71) Applicant: Digital Guardian LLC, Waltham, MA (US)

(72) Inventors: Andrei Sheretov, Santa Clara, CA (US); Naveen Ramaiah, Santa Clara, CA (US); Praveen Banoth, Santa Clara, CA (US); Sunil Agrawal, Santa Clara, CA (US)

(73) Assignee: Digital Guardian LLC, Waltham, MA (US)

( * ) Notice: Subject to any disclaimer, the term of this patent is extended or adjusted under 35 U.S.C. 154(b) by 264 days.

This patent is subject to a terminal disclaimer.

(21) Appl. No.: 15/343,242

(22) Filed: Nov. 4, 2016

(65) Prior Publication Data

US 2017/0093925 A1    Mar. 30, 2017

Related U.S. Application Data

(63) Continuation of application No. 13/889,345, filed on May 7, 2013, now Pat. No. 9,489,356.

(60) Provisional application No. 61/643,464, filed on May 7, 2012, provisional application No. 61/643,476, filed on May 7, 2012, provisional application No. 61/646,918, filed on May 15, 2012, provisional application No. 61/649,386, filed on May 21, 2012, (Continued)

(51) Int. Cl.
*G06F 16/954* (2019.01)
*H04L 29/06* (2006.01)
*G06F 16/958* (2019.01)
*G06F 40/14* (2020.01)

(52) U.S. Cl.
CPC ............ *H04L 63/20* (2013.01); *G06F 16/954* (2019.01); *G06F 16/986* (2019.01); *G06F 40/14* (2020.01); *H04L 63/0281* (2013.01)

(58) Field of Classification Search
CPC .......... G06F 17/2247; G06F 17/30873; G06F 17/30905; G06F 17/30017; H04L 63/0281
See application file for complete search history.

(56) References Cited

U.S. PATENT DOCUMENTS 6,484,261 B1   11/2002  Wiegel
6,826,698 B1   11/2004  Minkin et al.
(Continued)

FOREIGN PATENT DOCUMENTS

WO    WO-01/46873      6/2001
WO    WO-01/86476      11/2001
WO    WO-2013/169827   11/2013

OTHER PUBLICATIONS

AdNovum Informatik AG (2013) "Secure Internet Collaboration with Co-Browsing." Retrieved from http://www.adnovum.ch/en/solutions/nevis.html.
(Continued)

*Primary Examiner* — Howard Cortes
(74) *Attorney, Agent, or Firm* — Foley & Lardner LLP

(57) ABSTRACT

Systems and methods for enhanced DOM and event mirroring and security in web applications provides an intermediate Master Browser between web content and client devices to improve security and other enhancements.

20 Claims, 13 Drawing Sheets

Related U.S. Application Data provisional application No. 61/649,383, filed on May 21, 2012.

(56) References Cited

U.S. PATENT DOCUMENTS

| | | | |
|---|---|---|---|
| 6,871,213 B1* | 3/2005 | Graham | G06F 17/30873 707/E17.111 |
| 7,054,952 B1* | 5/2006 | Schwerdtfeger | H04L 67/2823 709/246 |
| 7,203,744 B1 | 4/2007 | Parekh et al. | |
| 7,660,899 B2 | 2/2010 | Gavrilescu et al. | |
| 8,185,548 B2 | 5/2012 | Lim | |
| 2001/0056476 A1* | 12/2001 | Benayoun | H04L 29/1216 709/218 |
| 2002/0004784 A1 | 1/2002 | Forbes et al. | |
| 2002/0015042 A1* | 2/2002 | Robotham | G06F 3/14 345/581 |
| 2003/0149934 A1 | 8/2003 | Worden | |
| 2005/0240596 A1 | 10/2005 | Worthen et al. | |
| 2007/0233851 A1 | 10/2007 | Ma | |
| 2008/0072136 A1 | 3/2008 | Lotenberg | |
| 2008/0208789 A1 | 8/2008 | Almog | |
| 2009/0178105 A1* | 7/2009 | Feng | H04L 63/083 726/1 |
| 2009/0182803 A1 | 7/2009 | Barton et al. | |
| 2009/0265607 A1 | 10/2009 | Raz et al. | |
| 2009/0292984 A1* | 11/2009 | Bauchot | G06F 17/30896 715/234 |
| 2009/0293102 A1* | 11/2009 | Klein | G06F 21/52 726/2 |
| 2010/0017464 A1 | 1/2010 | Cheng et al. | |
| 2010/0049850 A1 | 2/2010 | Nanduri et al. | |
| 2010/0228880 A1* | 9/2010 | Hunt | G06F 17/30905 709/246 |
| 2010/0274910 A1* | 10/2010 | Ghanaie-Sichanie | H04L 9/3234 709/229 |
| 2010/0306642 A1* | 12/2010 | Lowet | G06F 17/30873 715/234 |
| 2011/0010612 A1 | 1/2011 | Thorpe et al. | |
| 2011/0022559 A1* | 1/2011 | Andersen | G06F 17/30905 706/47 |
| 2012/0054616 A1 | 3/2012 | Mittal | |
| 2012/0210243 A1* | 8/2012 | Uhma | G06F 17/30893 715/744 |
| 2012/0278851 A1 | 11/2012 | Dan | |
| 2013/0007241 A1* | 1/2013 | Trahan | H04L 67/40 709/223 |
| 2013/0254829 A1* | 9/2013 | Jakubowski | G06F 21/53 726/1 |

OTHER PUBLICATIONS

Barth, A. (2011) "HTTP State Management Mechanism," Internet Engineering Task Force RFC 6265. Retrieved from http://tools(.)ietf(.)org/html/rfc6265.

Cooper, E. (2009) "Programming Language Features for Web Application Development," Doctoral Thesis, School of Informatics, University of Edinburgh.

GitHub (2013) "Mozilla Browser Mirror." Retrieved from https(: )//github(. )com/mozilla/browsemirror (3 Pages).

GitHub (2013) "Mozilla Browser Mirror: To Do." Retrieved from https ://github(. )com/mozilla/browsermirror/blo b/master/todo(. )txt (2 Pages).

Goinstant (2012) "Co-Browsing Like Never Before." Retrieved from htto ://www(.) go instant(. )com/features/.

Goinstant (2012) "GoInstant and E-Commerce Benefits: Replicating the Brick & Mortar Customer Experience." Retrieved from http://s3(.)amazonaws(.)com/website(.)s3(.)go instant(.)com/wpcontent/uploads/2012/05/Goinstant-and-E-Commerce(.)pdf.

Goinstant (2012) "Supported Browsers & Platforms." Retrieved from http://www(.)goinstant(.)com/how-it-works/supportcd/.

Goinstant (2012) "The Shared Web Manifesto." Retrieved from http://www(.)goinstant(.)com/the-shared-web-manifesto.

Goinstant (2012) "Use Cases." Retrieved from http://www(.)goinstant(.)com/use-cases.

Goinstant (2012) "What is Shared Browsing Technology?" Retrieved from http://s3(.)amazonaws(.)com/website(.)s3(.)go instant(.)com/wpcontent/uploads/2012/04/Goinstant-Shared-Web-Technology(.)pdf.

GoInstant (2012) "The Connected Customer Revolution Ts Here: Introducing the Next Generation In Co-Browsing." Retrieved from http://www(.)goinstant(.)com.

Innovation Nights (2012) "Encapsulator." Retrieved from http://mass(.)innovationnights(.)com/products/encapsulator.

International Preliminary Report on Patentability on International Application No. PCT/US2013/040013 dated Nov. 11, 2014.

International Search Report issued in International Application No. PCT/US2013/040013, Date of Completion of Search: Aug. 20, 2013 (2 pages).

Supplementary European Search Report on EP Application No. EP13788509 dated Aug. 19, 2016.

U.S. Notice of Allowance on U.S. Appl. No. 13/889,345 dated Jun. 23, 2016.

U.S. Office Action on U.S. Appl. No. 13/889,345 dated Dec. 7, 2015.

U.S. Office Action on U.S. Appl. No. 13/889345 dated Jun. 19, 2015.

W3C (2010) "Same Origin Policy: Web Security." Retrieved from http://www(.)w3(.)org/Security/wiki/Same_Orgin_Policy.

W3C (2012) "Content Security Policy 1.0: W3C Candidate Recommendation Nov. 15, 2012." Retrieved from http://www(.)w3(.)org/TR/CSP/.

W3C (2012) "File API: Directories and System, W3C Working Draft Apr. 17, 2012." Retrieved from http://www(.)w3(.)org/TR/file-system-api/.

W3C (2013) "Geolocation API Specification: W3C Recommendation Oct. 24, 2013." Retrieved from http://www(.)w3(.)org/TR/geolocation-API/.

W3C (2013) "HTML Media Capture API: W3C Candidate Recommendation May 9, 2013." Retrieved from http://www(.)w3(.)org/TR/html-media-capture/.

W3C (2013) "Indexed Database API: W3C Candidate Recommendation Jul. 4, 2013." Retrieved from http://www(.)w3(.)org/TR/IndexedDB/.

W3C (2013) "WebGL: Editor's Draft Nov. 25, 2013." Retrieved from https://www(.)khronos(.)org/registry /we bgl/ specs/latest/.

W3C (2014) "Pick Contacts Intent: W3C Working Group Note Jan. 14, 2014." Retrieved from http://www(.)w3(.)org/TR/contacts-api/.

W3C (2014) "The System Information API: W3C Working Group Note Jan. 14, 2014." Retrieved from http://www(.)w3(.)org/TR/system-info-api/.

W3C (2014) "Web Storage: Editor's Draft Jan. 17, 2014." Retrieved from http://dev(.)w3(.)org/html5/webstorage/.

Wikipedia (2013) "Cobrowsing." Retrieved from http://en(.wikipedia(.)org/wiki-Cobrowsing.

Zhang, Hong-Jiang et al., "Adapting Web Pages for Small-Screen Devices", IEEE Internet Computing, IEEE Service Center, New York, NY, Institute of Electrical and Electronics Engineers, Jan. 1, 2005, vol. 9, No. 1.

* cited by examiner

*FIG. 13A*

| Original HTML: | DOM dump from slave: |
|---|---|
| ```<br><html><br><head><br><br><script type="text/javascript"<br>src="jquery.js"></script><br><style type="text/css"><br><br>@import<br>'externalStylesheet.css';<br>html, body { background-color:orange; }<br></style><br><br><link rel="stylesheet" type="text/css"<br>href="externalStylesheet.css" /><br><br><meta http-equiv="refresh" content="10"><br><script type="text/javascript"><br>$(function(){ $('*').css('font-style',<br>'italic');}); </script><br></head><br><br><body><br><button<br>onclick="javascript:$('*').css('font-style',<br>'italic')">Italicize</button><br><button<br>onclick="javascript:$('*').css('font-style',<br>'')">Deitalicize</button><br></div><br>``` | ```<br><html><br><head><br><base armorsid="5243015073615"<br>href="http://example.com:8443/browserUsedBaseHrefInvestigate/"<br>target="_self"><br><script armorsid="5243015073364"></script><br><style armorsid="5243015073366" style="font-style: italic;"<br>type="text/css"><br><br>@import<br>"http://example.com:8443/writtenByMaster/writtenFromWithinCss/9fc0d3<br>7d490280293lc0bc47e54f8dc7e6b7ef.css?type=urlStylesheetOther";<br>html, body { background-color:orange; }<br></style><br><br><link armorsid="5243015073610" style="font-style: italic;"<br>rel="stylesheet" type="text/css"<br>href="http://example.com:8443/writtenByMaster/9fc0d37d490280293lc0b<br>c47e54f8dc7e6b7ef.css?elem=link&attr=href&type=urlStyleShee<br>t"><br><br><meta armorsid="5243015073612"><br><script armorsid="5243015073614"></script><br><br></head><br><br><body><br><button armorsid="5243015073631" onclick="javascript:void(0)"<br>style="font-style: italic;">Italicize</button><br><button armorsid="5243015073634" onclick="javascript:void(0)"<br>style="font-style: italic;">Deitalicize</button><br></div><br>``` |

ENHANCED DOCUMENT AND EVENT MIRRORING FOR ACCESSING INTERNET CONTENT

CROSS REFERENCE TO RELATED APPLICATIONS

The present application is a continuation application which claims priority to U.S. patent application Ser. No. 13/889,345, filed May 7, 2013, entitled "ENHANCED DOCUMENT AND EVENT MIRRORING FOR ACCESSING INTERNET CONTENT," which application claims priority to (i) U.S. Provisional Patent Application No. 61/643,464, filed May 7, 2012, (ii) U.S. Provisional Patent Application No. 61/643,476, filed May 7, 2012, (iii) U.S. Provisional Patent Application No. 61/646,918, filed May 15, 2012, (iv) U.S. Provisional Patent Application No. 61/649,383, filed May 21, 2012, and (v) U.S. Provisional Patent Application No. 61/649,386, filed May 21, 2012, all of which are hereby incorporated by reference in their entireties.

All referenced documents and application herein and all documents referenced therein are incorporated in by reference for all purposes.

COPYRIGHT NOTICE

Pursuant to 37 C.F.R. 1.71(e), applicant notes that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to logic systems. More particularly, it relates to computer systems, digital media systems, and associated systems and methods related to delivering content and in some situations exchanging data over a digital communications network. In further embodiments, one or more methods may be implemented on a data handling device or system, such as a computer or other information enabled device.

BACKGROUND OF THE INVENTION

Since early in computing, a number of different methods have been used to show a user at one location the same screen being viewed at another location. Early time sharing systems in some cases allowed two different users at two different displays to connect to the same terminal input and output port and thus both effectively see and at times interact with the same screen. Prior to widespread use of the Internet, a number of programs (e.g., PCAnywhere™) allowed a PC user in New York, for example, to interact with a PC in Los Angeles as though the New York user were in Los Angeles. A specialized software component running on the New York computer would capture any user input events (e.g., keystrokes or mouse actions) and transmit them to a software component running on the Los Angeles computer for execution. Software on the Los Angeles computer would then generally send a screen capture back to the New York computer.

As networks and the Internet became more widely used, various Virtual Private Networking (VPN) systems were employed. These systems allowed a user at home, for example, to interact with his work office network as though he were there. In some VPN installations, a user at home can remotely logon to a specific computer at their work environment and interact with local and network files and applications in that work environment as though the person was at their work location. Again, in many instances, this type of VPN requires transmissions effectively of a "screen shot" between the two computers.

In the context of the World Wide Web, there has been growing interest in "co-browsing" using various technologies. "Co-browsing" generally involves two or more users at different computers viewing the same Internet content at the same time and may also allow two or more users to simultaneously interact with the same content at the same time.

U.S. Pat. No. 7,660,899, issued Feb. 9, 2010, discusses cobrowsing web sites by two or more users where a first client sends to a second client a synchronization message that indicates one or more commands reflecting the browsing performed by the first user. The second client receives the synchronization message, and cobrowses the web site in accordance with the message and its included commands. Cobrowsing can involve commands indicating location relative to a position within an element of the web page specified by a node identified in the document object model, wherein the location relative to the position is indicated as a percentage in each of the horizontal and vertical directions, the synchronization message sent from a first computing device having a first display with first display attributes to a second computing device having a second display with second display attributes different than the first display attributes.

These examples of the state of the art are intended to be illustrative and not exclusive.

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

SUMMARY

According to specific embodiments, the present invention is involved with methods and/or systems and/or devices that can be used together or independently to provide controlled content over a network or communication channel, such as the Internet. In specific embodiments, an intermediate system or device (at times herein referred to as the Master or Master Browser) is used to access publicly available web content (or in some examples, restricted content) and present that content to one or more controlled clients (at times herein referred to as Slaves or Slaves Browser). According to specific embodiments, a web application mirroring technology provides a server-based intermediary browser between a web server and a client device. The server-based intermediary constructs of a model of the visual representation of the page (e.g., document object model DOM effectively at the Master Browser system or other intermediate system and transmits that that DOM (optionally modified as described herein and generally without including elements such as JavaScript that are sometimes considered part of a DOM but do not affect the static visual appearance of the page) to a client device (referred to at times herein as a Slave Browser). The client system renders the visual output from the DOM and the visual output of the client system is updated by the master system first updating the DOM and then the updated DOM is rendered or laid-out at the client. Note that this form of "DOM mirroring" may differ from some other methods termed "DOM mirroring" in a number of ways. Primarily, in the present system, the slave DOM is generally not updated by the Slave Browser, for example, but is only updated via messages from the Master. Thus, various co-browsing systems that have various client devices constructing their own DOM from web content based on synchronization commands from a remote device, may refer to this method as creating a mirror DOM, but that DOM is one constructed by client software from content.

According to specific embodiments, a Master browser typically will not display its DOM to a user, but uses a browser or layout engine at the Master site (or server) to determine the DOM and optionally also determine other browser state information and transmits that to a user.

The master and Slave Browser additionally can provide event mirroring and additional techniques that enable use of advanced web browser APIs and secure storage of user session information. In further embodiments, a system or method provides an efficient technique of fetching web application resources.

According to various specific embodiments, a system or method as described herein includes one or more novel enhancements, including the intermediate browser recognizing model interface (e.g., API) calls that require access to local client data and messaging the client to provide the same; the intermediate browser forwarding information about cookies and other session state needed at the intermediate browser to the client browser for long term storage and when the client browser disconnects from the intermediate browser, the intermediate browser discards all session information accumulated and upon a reconnection to the intermediate browser by the client browser, the client forwarding any stored information from previous sessions; the client browser is able to immediately perform one or more browser content interactions; the client browser assigns a unique identity to each event and transmits event information to the intermediate browser and when the intermediate browser replays an event and it results in a different action that what was already performed, the intermediate browser informs the client browser of the discrepancy and provides the client browsers a set of instructions to correct the discrepancy; the intermediate browser provides one or more direct links for external resources of specific types to the client browser and when the client browser attempts to directly fetch any resource if there is an error, the client browser notifies the master browser that then supplies the resource; the intermediate browser making modifications to the model to prevent data leakage at the client browser; the intermediate browser implementing one or more security policies at the intermediate browser, thereby providing enhanced security while requiring no modifications to external content providers or the client browser; the intermediate browser establishing a secure connection with a secured or restricted content provided and authenticating a user at the client browser before allowing access to the website and further ensuring that all URLs in the mirrored model that indicate resources on the restricted site that would generally be directly fetched by the client browser, are rewritten to URLs indicating a proxy able to provide the resources from the restricted site.

Various embodiments of the present invention provide methods and/or systems for secure communications over a communications network. According to specific embodiments of the invention, a client system is provided with a web application or interfaces that allow a user to view and interact with a webpage via an intermediate browser, where the intermediate browser can act as a security measure or provide other enhancements. The client system displays information from the web page and displays indications of actions a user can perform to interact with the webpage. In response to a user input, the client system sends to the event a server system the necessary information to interact with the webpage. The server system uses the event data, and optionally one or more sets of server data, to process the request. According to specific embodiments of the present invention, a client system is, or has previously been, provided with an executable code file that allows the client system to receive data and messages from the server system.

Thus, in further embodiments, the present invention may be understood in the context of content viewing over a communication media. An important application for the present invention, and an independent embodiment, is in the field of providing secure sessions over the Internet, optionally using Internet media protocols and formats, such as HTTP, RTTP, XML, HTML, dHTML, VRML, as well as image, audio, or video formats etc. However, using the teachings provided herein, it will be understood by those of skill in the art that the methods and apparatus of the present invention could be advantageously used in other related situations where users access content over a communication channel, such as modem access systems, institution network systems, wireless systems, etc. All publications, patents, and patent applications cited herein or filed with this application, including any references filed as part of an Information Disclosure Statement, are incorporated by reference in their entirety.

The general structure and techniques, and more specific embodiments that can be used to effect different ways of carrying out the more general goals are described herein. Thus, while only a few embodiments have been disclosed in detail herein, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative that might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in JavaScript, C, Python, Java or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium, or other removable medium. The programs may also be run over a network, for example, with a server or other machine sending signals to the local machine, which allows the local machine to carry out the operations described herein.

Various embodiments of the present invention provide methods and/or systems for that can be implemented on a general purpose or special purpose information handling appliance or logic enabled system using a suitable programming language such as JavaScript, Java, C++, C#, Cobol, C, Pascal, Fortran, PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

All references, publications, patents, and patent applications cited herein are hereby incorporated by reference in their entirety for all purposes.

BRIEF DESCRIPTION OF THE DRAWINGS

FIG. 13A-B is a table showing one specific example of some of the modifications made to the minored model according to specific embodiments of the present invention.

DESCRIPTION OF SPECIFIC EMBODIMENTS

Figure 1:
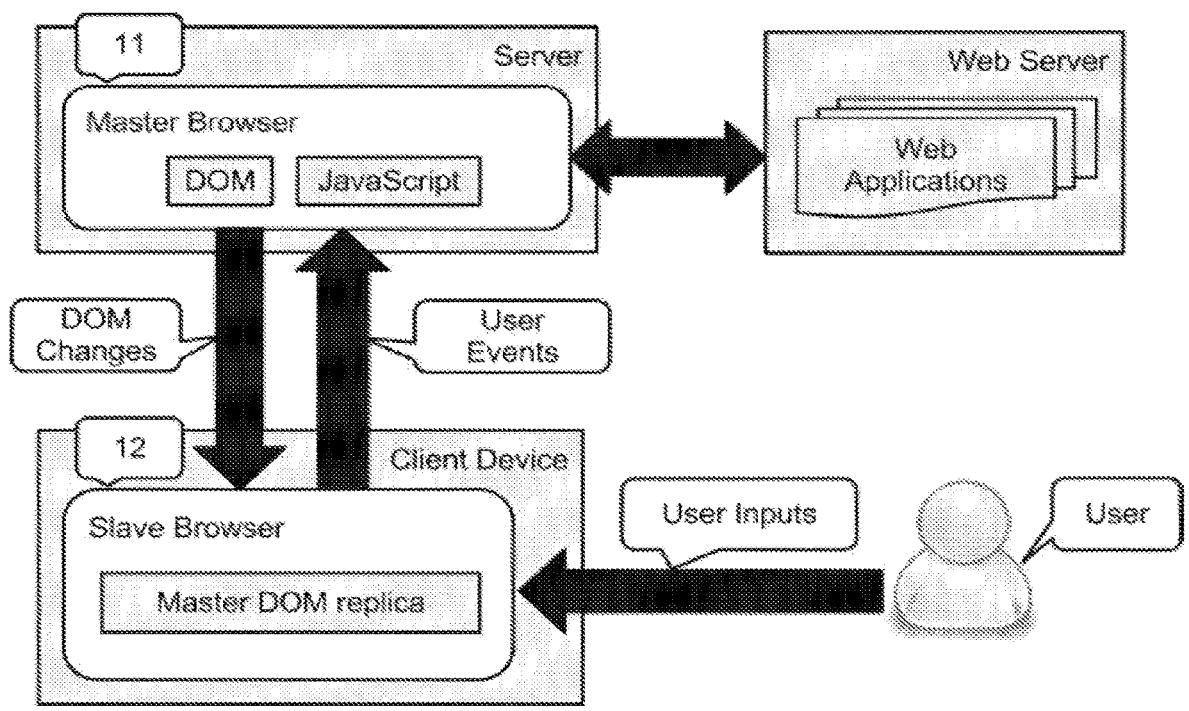
FIG. 1 illustrates communications between a master system and slave system according to specific embodiments.

Before describing the present invention in detail, it is to be understood that this invention is not limited to particular compositions or systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content and context clearly dictates otherwise. Thus, for example, reference to "a device" includes a combination of two or more such devices, and the like.

Unless defined otherwise, technical and scientific terms used herein have meanings as commonly understood by one of ordinary skill in the art to which the invention pertains, including commonly understood variations. Although any methods and materials similar or equivalent to those described herein can be used in practice or for testing of the present invention, the preferred materials and methods are described herein.

Overview

This discussion is related to the field of providing content over digital communications networks, such as the Internet. As is well understood in the art, much of this content is provided over the network in a various standardized markup language (e.g., HTML), executable languages (e.g., JavaScript), and data specifications (e.g., XML) and is accessed through one of a variety of web browsers, which each present the content defined by the HTML. Standards for HTML, etc. are available at: www(.)w3(.)org and a number of tutorials discussing different aspects of these standards can be found at www(.)w3schools(.)com.

DOM

This discussion is particular aspects is related to providing content over the Internet through the modification or enhancement of items that are also well known and understood in the art. For example, a Document Object Model (DOM) as used herein and understood in the art, is a standardized cross-platform representation or model of objects generally related to presentation of Internet content. A DOM can contain objects and elements specified in various languages or data formats, e.g., HTML, XHTML, XML, JSP, JavaScript, etc. The DOM standard provides application programming interfaces (APIs) that allow processes and programs to interact with the DOM. Most web browsers in use today include layout engines that create from web content an internal model of a web page or document similar or identical to the DOM, and then use the DOM to layout or render the content to a user at the browser. The DOM is a W3C (World Wide Web Consortium) standard, which defines an HTML DOM for accessing and manipulating HTML documents; an XML DOM for accessing XML data; and a Core DOM as standard model for any structured document. The HTML DOM defines the objects and properties of all HTML elements, and the methods to access them. The HTML DOM is a standard for how to get, change, add, or delete HTML elements. The DOM represents an HTML document as a tree-structure. In general, the most commonly used programming language for interacting with the DOM in a browser is JavaScript. In the HTML DOM, everything is a node. The DOM is HTML viewed as a node tree. Wherever DOM is used in this discussion, it will be understood that other types of structured models or representations of web content that can be mirrored or operated on as described herein are also included.

Events

HTML and the DOM allow code to execute when an "event" occurs by defining a number of events that can be specified using HTML. Events in this context are understood to be generated by the browser when something happens to HTML elements, often as a result of user input. Examples of events include: an element is clicked on; a page has begun loading; a page has completed loading; input fields are changed or a character is typed in an input field, a pointer is moved (e.g., a mouse or touch screen pointer.)

As a further example, the <script> tag is used in HTML to define a client-side script, such as a JavaScript. The <script> element either contains scripting statements that are recognized and executed by the browser, or it can indicate an external script file (e.g., through an src attribute.) A JavaScript can be executed when an event occurs, like when a user clicks on an HTML element. An event handler is part of the JavaScript executable environment that is provided by most browsers. The HTML DOM allows you to assign events to HTML elements using JavaScript. Some events are defined that are very fine-grained. For example, the onmousedown, onmouseup, and onclick events are all parts of a single mouse-click.

1. Enhanced DOM and Event Mirroring

FIG. 1 illustrates communications between a master system and slave system according to specific embodiments. FIG. 1 illustrates an intermediate web browser (also at times herein referred to as a virtual browser or Master Browser) executing on a server 11 and a client browser (also referred to as a Slave Browser herein) executing on a user's computing device 12 that maintains a network connection to the intermediate browser.

Master Browser and Slave Browser

System and methods as described herein generally involve network communication between three major components (1) an external web content provider; (2) a Master Browser, as described herein, and (3) a Slave Browser as described herein. The Master Browser as described herein, acts as an intermediate browser or virtual browser for fetching most content from the external sources, determining a DOM for displaying the content, and executing and scripts or executables that may modify the DOM or provide other executable functions. The Master Browser directly controls actions and presentations at the Slave Browser by controlling the Slave Browser DOM and limiting the events and actions that are executed directly at the Slave Browser. The Slave Browser provides a user interface for presenting content to a user and accepting user input. As described below, some user input is responded to directly at the Slave Browser and messaged to the Master Browser. User input that affects the contents of the Slave Browser DOM however is messaged to the Master Browser, which replays the user input and makes necessary modifications to the Master Browser DOM. These changes are then messaged to the Slave Browser, which modifies the Slave Browser DOM only as specifically directed to by the Master Browser.

According to specific embodiments, implementations of the Master Browser and Slave Browser vary and in some implementations may off-the-shelf browsers (e.g., Firefox, Chrome, Safari, etc.) as the core browser for either or both the Master Browser and the Slave Browser. According to specific embodiments, the core browser generally handles a number of standard web and user input interactions, except as modified as discussed herein.

According to specific embodiments, additional functions of the Master Browser are implemented with a browser extension (e.g., a Firefox Add-on written in JavaScript) and additional functions of the Slave Browser are implemented by a web application, at times referred to as the slave web application.

In other embodiments, various components or all of the Master or Slave Browser may be implemented in proprietary or specially designed code.

As a further description, the Master Browser can generally considered as be divided into two components or functions. The standard browser component of the Master Browser receives Internet content (generally HTML) and parses that content to create and maintain a document object module (DOM) for a web document being accessed. The Master Browser extension component watches the DOM and transmits serialized messages to the Slave Browser for creating the web experience for a user at the Slave Browser.

As a further description, the Slave Browser (also referred to as the client browser or client device) is generally an off-the-shelf browser executing a web-application (referred to herein as the slave or client application), which, for example, may be implemented in JavaScript or any other code that is executable at the Slave Browser or client device. Operation of these components according to specific embodiments will be further understood from consideration of the details provided below.

Thus, according to specific embodiments, a Master Browser loads web pages and executes associated scripts. The Master Browser maintains a Document Object Model (DOM) data structure with all information necessary to display the visual representation of the web page.

According to specific embodiments, DOM mirroring as shown in FIG. 1, includes monitoring contents of the Master Browser DOM by the Master Browser and sending messages regarding the content or any changes to the Master Browser DOM to the Slave Browser, which constructs a generally modified replica referred to herein as of the Slave Browser DOM. Generally, only elements that affect visual appearance of the web content being accessed at the Slave Browser are transmitted as part of this process. Thus, the Master Browser evaluates which elements are necessary and desired in the Slave Browser DOM.

According to specific embodiments, event mirroring, shown in FIG. 1, comprises the Slave Browser monitoring user interactions with the web content, such as keyboard, mouse, voice activated, position or motion activated, timer, touchscreen or other events, and sending this information to the Master Browser. The Master Browser replays the received user interaction events in the core browser and in the context of the DOM stored for the page and any additional configuration information at the Master Browser, thus potentially affecting the state of the web content. For example, if a user clicks or otherwise indicates or activates a hyperlink in the Slave Browser, the click event is captured and transmitted to the Master Browser. The Master Browser then replays the event using the context of the Master Browser (e.g., DOM, other session or browsing state, cookies, etc.), for example emulating a mouse click at the specified coordinates. If the event is a direction to a new page, the Master Browser then navigates to a new web page, and the Master Browser DOM contents change to reflect the new page. The Master Browser detects these changes and transmits them to the Slave Browser to modify the Slave Browser DOM or otherwise affect the display to the user. From the user's perspective, when DOM mirroring and event mirroring are both used, a web page or web application mirrored between master and Slave Browsers appears and behaves exactly like the same application executing directly in the Slave Browser though optionally with any restrictions or modifications imposed by the Master Browser as discussed below.

A Master Browser, according to specific embodiments, is an executable instance (e.g., a process or collection of processes) of a software module or system running on an appropriate computer system, such as a server. In some embodiments the Master Browser observes and communicates using a Master Browser DOM generated by a parser of a standard or propriety web browser application, e.g., Chrome, Safari, Firefox, Internet Explorer, Opera, Dolphin, etc.). In some embodiments, the Master Browser also uses the layout portion of a standard or propriety web browser application, e.g., Chrome, Safari, Firefox, Internet Explorer, Opera, Dolphin, etc.) to determine other state at the Master Browser. The Master Browser includes further software components or modules or processes as described herein to communicate with a Slave Browser.

In specific embodiments, a Master Browser may be a custom designed browser, optionally based on available browser source code that can operate as described herein. In other embodiments, a Master Browser includes logic modules that run within an off-the-shelf browser. These components may communicate to the browser and execute within a standard browser provided extension or API interface, e.g., "add-on" or "plug-in" or "extension" for various browsers.

In specific embodiments, separate and independent instances or processes or threads of a Master Browser (and also optionally separate and independent instances or processes or threads of a core browser including a layout engine) are started for each user accessing a web site through a Slave Browser.

In one specific example embodiment, a Master Browser is an executing instance of Firefox with extensions that perform the functions described herein. A Slave Browser generally is a standard browser accessing an executing a slave web application.

DOM Mirroring

A Master Browser DOM as described above is generally the DOM created by a standard browser. According to specific embodiments, one or more modifications to the Master Browser DOM are reflected in the Slave Browser DOM that the Master Browser directs the Slave Browser to create. Many of these modifications are configurable, for example depending on settings determined by IT administrator who is configuring the service for their enterprise.

A number of modifications regard elements or information that may be contained in the Master Browser DOM according to DOM standards. For example, DOMs commonly include external links to other potentially active content, such as external HTML pages, external Flash/Java/SilverLight content. Links to external media objects that generally can provide no security risks or active content, such as for images, audio, or video, may be left unmodified in the Slave Browser DOM.

All script tags are generally stripped. As discussed herein, script execution is performed on the Master Browser. Other examples of modifications that may be made between the master DOM and slave DOM are described below. Many of these are optional or are only required for specific features as discussed further herein.

In order to protect user's privacy, the Master Browser may remove the 'ping' attribute from Anchor and Area tags.

Some meta tags or instructions that would cause the Slave Browser to perform actions that according to specific embodiments are controlled by the Master Browser are removed from the slave DOM or otherwise rendered non-operative. For example, meta refresh may be deleted as generally the Slave Browser should not refresh, as refresh should be performed at the Master Browser, and the effects on the master DOM mirrored to the slave DOM. X-FRAME-OPTIONS are removed as that could prevent putting the page within an iframe at the Slave Browser, which is used in some implementations. 'Set cookie' meta tag may also be deleted because cookie mirroring achieves that effect. According to specific embodiments, all the 'on' (e.g. onclick) attributes are removed from all elements. Javascript URIs are not mirrored. Generally iframes/embed/object tags pointing to documents are treated the same way as the top level document, i.e. the JS is deleted and only the representative HTML is mirrored.

According to specific embodiments, mirroring can also add information to the slave DOM, such as info on the number of children, etc., so that it can help keep the slave DOM and master DOM in sync and allow use of incremental synchronizations. Furthermore, mirroring can include unique identifiers for DOM elements to aid in synchronizations.

Generally, most URLs are written to point to a server or a proxy designated by the Master Browser during mirroring. According to specific embodiments, if the resource is on a private network, always rewrite. Else if the resource can be fetched over HTTPs, and it is for a certain type of resource (e.g., image/audio/video/css), keep the original URL, and optionally put the rewritten URL in the slave DOM as a alternate source, in case it can't be fetched directly. For other content (e.g., HTML) the URL is always rewritten. And optionally, if the resource can't be fetched over HTTPs, rewrite the URL.

As discussed below, this is to optimize scenarios where if the resource is available directly from the external source, fetch it, else ask the Master Browser proxy to fetch it. Enhances overall experience, as audio/video usually are fetched directly from source without involving the Master Browser.

If the URL has the scheme mailto, sms, tel, which should invoke the native (on the client device) Email application, SMS application and Call application respectively, then those URLs may not be rewritten, so that native applications can be used.

In general, URLs are rewritten within HTML (including STYLE element and style attribute) and CSS. This is recursively done in nested documents, i.e. including documents present in (i)frame/embed/object and imported CSS.

Event Mirroring

According to specific embodiments, event mirroring refers to mirroring events that occur at the Slave Browser to the Master Browser. As discussed above and as understood in the art, events are detected by standard browsers in response to various user interactions. Also, as discussed above, these events, when responded to, may be responded to with JavaScript. Therefore, according to specific embodiments, the Slave Browser reacts to events by mirroring them to the Master Browser, which replays the events in context. Events that affect the DOM are therefore first used to modify or update the mbDOM, which is then transmitted to the slave DOM through event mirroring. According to specific embodiments, the Slave Browser assigns a number or other identifier to the event and gets acknowledgement messages back for each event that is successfully replayed at the Master Browser and error messages in case of an error.

Enhanced Mirroring

DOM and Event mirroring techniques described above are sufficient for executing many basic web applications and having a user interact with the same through a mirrored representation. However, use of other, generally more advanced browser capabilities such as those described below are enabled using additional methods or logic components. Thus, according to specific embodiments, one or more further methods or logic modules as described below are used in a system as described herein.

Extended API Support

Figure 2:
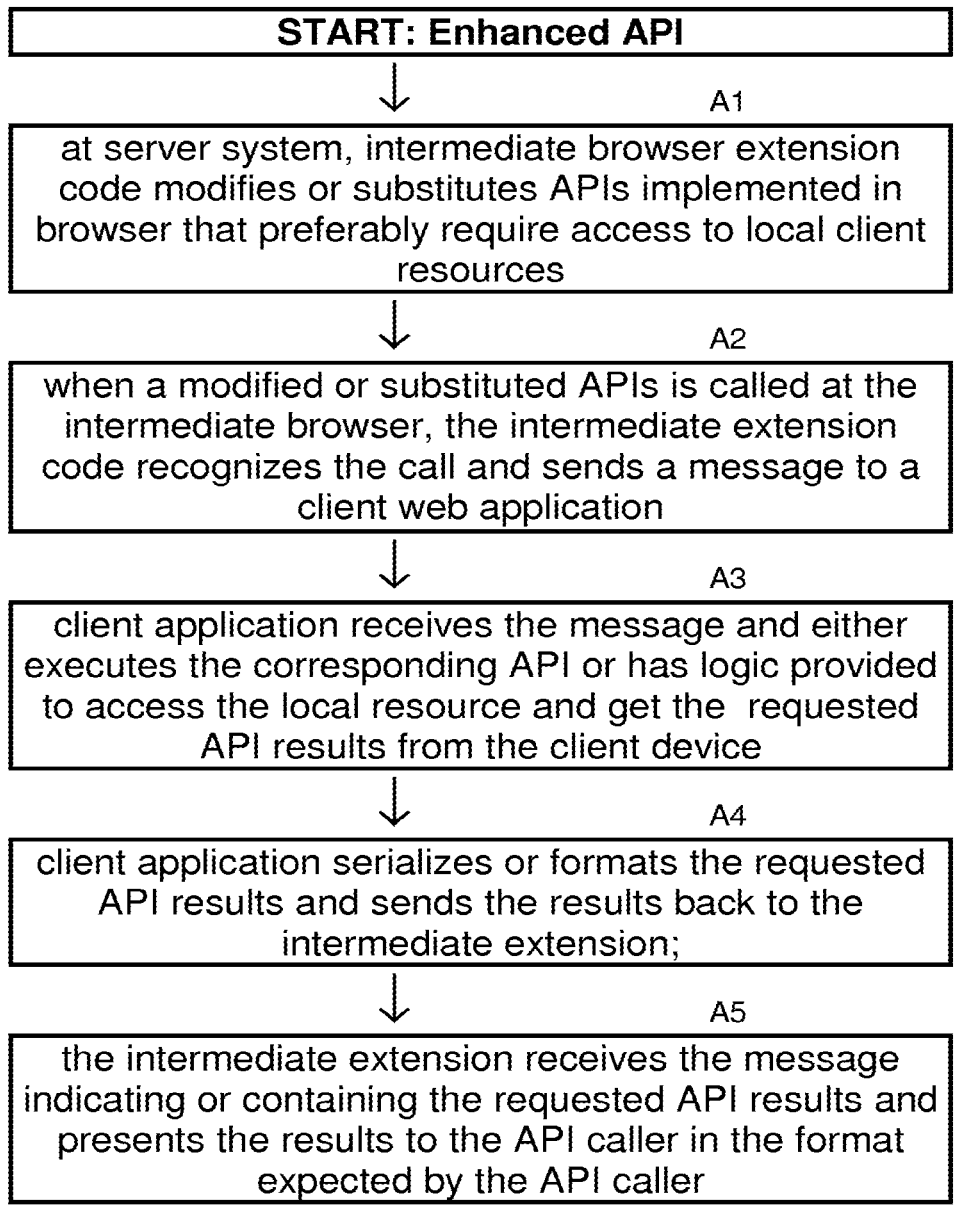
FIG. 2 is a flow chart illustrating advanced API handling according to specific embodiments.

Because, in the embodiment described above, some executable code downloaded from the internet or locally installed (e.g., JavaScript code of a web application) executes in the Master Browser, some of browser APIs that rely on access to local features of the client device require a special modification. Modification of these APIs is accomplished according to specific embodiments by further code in the Master Browser extension. Examples of these are discussed below. Thus, according to specific embodiments, the Master Browser execution environment, e.g., JavaScript, is modified to replace implementations of APIs described above with versions that send the information about the API call to the Slave Browser, generally using serialize parameters. FIG. 2 is a flow chart illustrating advanced API handling according to specific embodiments.

The Slave Browser recognizes the supported API call information sent by the Master Browser, recovers parameter data from the supported API call message, and makes a local API call using this parameter data. This may be implemented by the Slave Browser simply allowing the API call to execute in its core browser or the Slave Browser may include additional logic to execute a replacement of the API call that provides enhanced features, such as security.

The results of local API call are then formatted by the Slave Browser into a message that is sent to the Master Browser, where the replaced API implementation returns the result to whatever process or logic routine called the API. This mechanism allows for remote invocation of web executable logic (e.g., JavaScript APIs) by the Master Browser. From the point of view of a web program executing in the Master Browser, the behavior of the APIs is indistinguishable from the situation where the APIs were running directly on the local client, with the exception that various security policies or other modifications optionally have been made along the way according to specific embodiments.

According to specific embodiments, one or more of the following browser APIs are modified in the Master Browser generally as described above: Web Storage API [1]; File System API [2]; Indexed Database API [3]; Geolocation API [4]; HTML Media Capture API [5]; Contacts API [6]; The System Information API [7]; WebGL [8]; Canvas APIs.

HTTP Cookies

In the course of normal web browsing, web applications commonly save state information in some local storage, such as a web browser cookie store [9]. For example, cookies may contain authentication information about the current user of a web application or some other personally-identifiable information. Retaining cookies in the Master Browser between sessions of the same user, places additional security requirements on the server running the Master Browser, the storage mechanisms it employs, and has the disadvantage of unnecessarily storing person identification at the Master Browser for an unspecified time period.

Figure 3:
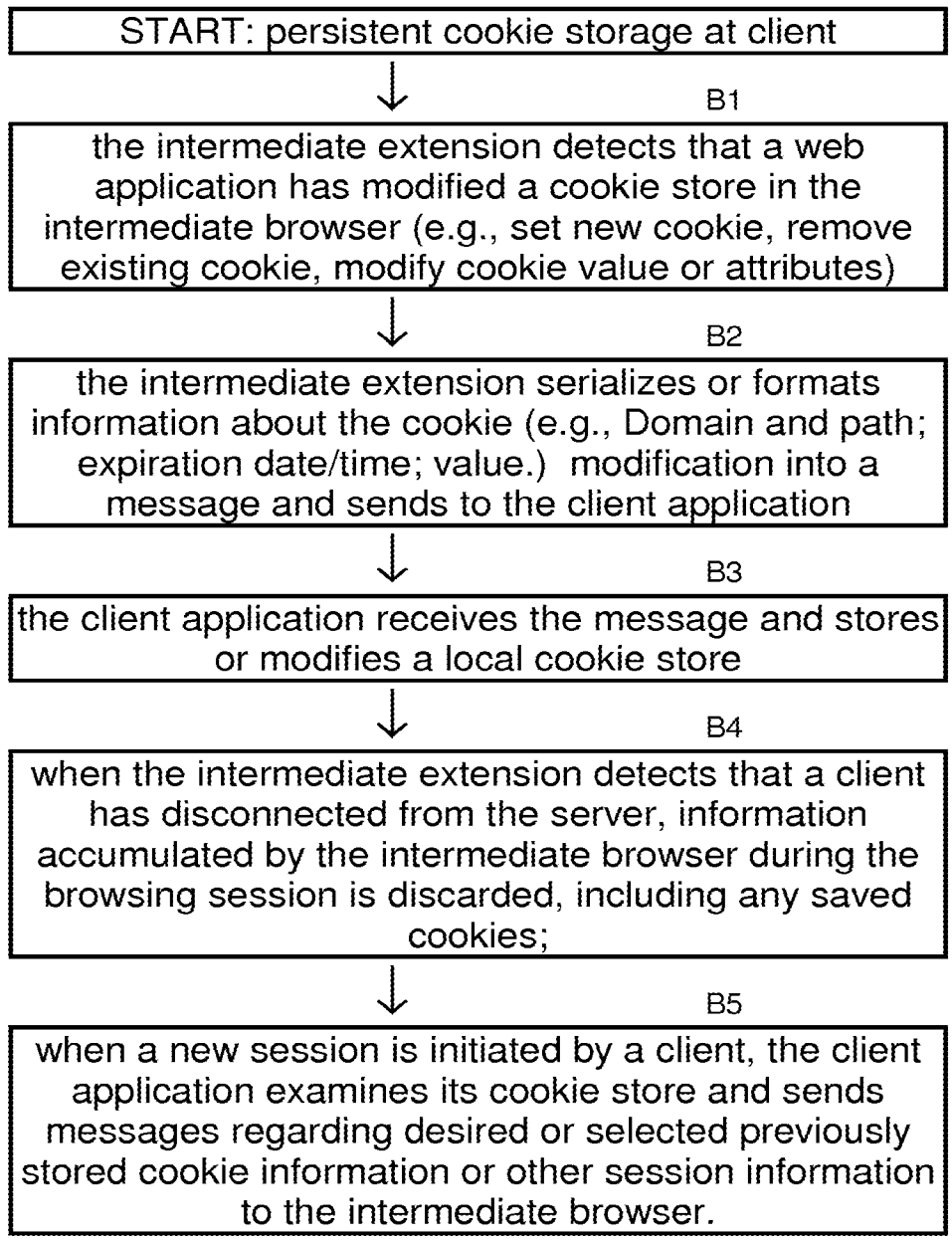
FIG. 3 is a flow chart illustrating keeping persistent cookie storage at a client system according to specific embodiments.

In order to decrease such requirements, according to specific embodiments, a method or system as described herein keeps persistent cookie storage at the client device or Slave Browser. FIG. 3 is a flow chart illustrating keeping persistent cookie storage at a client system according to specific embodiments. An example method proceeds as follows.

Whenever a web application modifies a cookie store in the Master Browser (set new cookie, remove existing cookie, modify cookie value or attributes), information about this modification is serialized or formatted into a message and sent to the Slave Browser. As an example, the following attributes are transmitted: Domain and path of the cookie; Cookie expiration date/time; Cookie value. Upon receiving a message from Master Browser with cookie modification information, the Slave Browser saves this information in its local cookie store. When the Slave Browser disconnects from the server running the Master Browser all information, accumulated by the Master Browser during the browsing session is discarded, including any saved cookies. Every time a new session with a Slave Browser is initiated, Master Browser starts with a 'clean state', with no history, cookies or cache entries from the previous browsing sessions. Upon connecting to a new Master Browser, Slave Browser examines its cookie store, and sends any cookie information that was previously saved to the Master Browser.

This technique allows for persistent storage of HTTP cookies, but relieves the Master Browser (and the server environment it is executing in) from the need to secure sensitive information present in the cookies between browser sessions. In some cases, it will also reassure clients using the service that sensitive or identifying information is not stored at the Master Browser as a matter of course. All that information is stored on the client device, which is controlled by the user who is free to implement any security measures they find appropriate, or delete the cookies from the Slave Browser's store.

Improving Responsiveness Through Local Interaction

One of the advantages of DOM and Event Mirroring techniques over traditional remote desktop and Virtual Desktop Infrastructure (VDI) solutions is that the user of Slave Browser can interact with mirrored web content locally, without incurring the penalty of round-trip network delays to see results of their actions.

Consider an example, in which a user of a traditional remote desktop system (e.g., a VDI system) is reading a long magazine article in a web browser. After reading the beginning of the article, the user wants to scroll the page to continue reading. In traditional, image-based remote desktop solutions, this requires the user action (click on a scrollbar or a page down key press) to be transmitted to the remote system where the browser is running, and then that browser to update its visual state in response to the user action, and finally the updated visual representation to be sent to the user's system, where the scrolled content is finally presented to the user. In other words, every scroll action is subject to round-trip network delays.

Consider the same scenario in a system using DOM Mirroring and Event Mirroring according to specific embodiments. In this case, the entire DOM of the web page containing the article, is mirrored from Master to Slave Browser. When the user wishes to scroll the page, Slave Browser can execute this action locally, without incurring the network delays. This is a qualitative improvement in responsiveness, compared to the traditional remote desktop system approach. In general, user actions at the Slave Browser that do not act upon a DOM or HTML element, such as a "page down" or "scroll" are not prevented from executing on the Slave Browser. In some cases, these actions are still reported to the Master Browser so that the Master Browser can determine what a user is currently viewing.

In addition to scrolling, browsers have a number of built-in content interaction mechanisms. In general, all these interactions benefit from the additional responsiveness made possible by the use of DOM and Event Mirroring. Example mechanisms include:

updating values of editable form fields in response to user keystrokes changing the state of checkboxes, radio buttons, drop-down lists, and other standard controls in response to user keystrokes, mouse clicks, or touch-screen taps.

Changing the keyboard focus in response to user mouse clicks, Tab keystrokes, or similar mechanisms.

Opportunistic Resource Fetching

Figure 4:
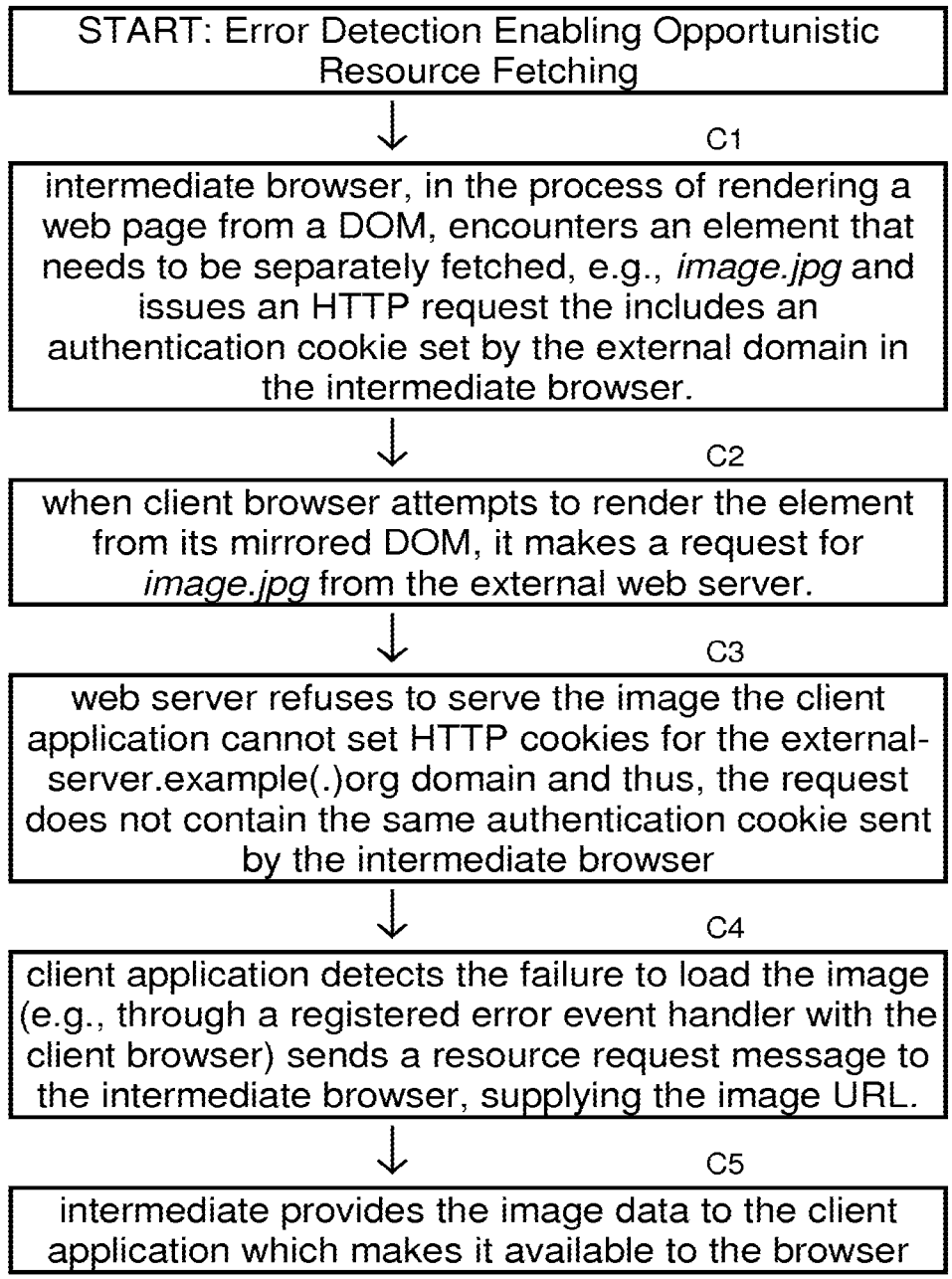
FIG. 4 is a flow chart illustrating fetching of content by the client from the intermediate browser when an error is detected at the client according to specific embodiments.

FIG. 4 is a flow chart illustrating fetching of content by the client from the intermediate browser when an error is detected at the client according to specific embodiments. Consider a case where an HTML image element URL has been mirrored between Master and Slave Browsers. The Master Browser DOM might includes the following element: <img src="http://external-server.example(.)org/image.jpg"/>, where the URL of the document, being rendered in the Master Browser is: http://external-server.example(.)org/index.html In the process of rendering the web page, the Master Browser makes an HTTP request for image.jpg from external-server.example(.)org. The HTTP request includes an authentication cookie set by the external-server.example(.)org domain in the Master Browser. External Server checks that the cookie belongs to a user authorized to access image.jpg, and responds with image data. Slave browser DOM mirrors the image element of the master DOM, including the same URL of the image. Slave browser attempts to render the element and makes a request for image.jpg.

Because of security features built into browsers, the Slave Browser cannot set HTTP cookies for the external-server.example(.)org domain that it receives from the Master Browser. Thus, the request for image.jpg, made by Slave Browser, does not contain the same authentication cookie sent with the request by the Master Browser. Some web servers will therefore refuse to serve the image or other content. According to specific embodiments, the Slave Browser detects this failure to load the image through a registered error event handler, and submits a resource request to the Master Browser, supplying the image URL. Since Master Browser was able to successfully download the image, it provides the image data to Slave Browser, and the image is successfully rendered.

As discussed above, generally, various types of media data (e.g., Image data, video data, audio data) are not part of the DOM. The DOM contains an image tag with a URL that points to the image file location. It is standard browser behavior upon encountering such DOM element to reference the URL and attempt to fetch and render the image.

Because the web server's policy of requiring an authentication cookie cannot be reliably predicted by the Slave or Master Browsers, the only opportunity to find out the outcome of a request without an authentication cookie is to make it and detect any errors that result. To minimize use of bandwidth between slave and Master Browsers, this failover technique of first using the original URL, and then requesting the data from Master Browser is used for data-intensive content (e.g., large image, audio, or video files) for which resource load error detection is supported by common web browsers.

REFERENCES

1. Web Storage API: http://dev.w3(.)org/html5/webstorage/
2. File System API: http://www(.)w3(.)org/TR/file-system-api/
3. Indexed Database API: http://www(.)w3(.)org/TR/IndexedDB/
4. Geolocation API: http://www(.)w3(.)org/TR/geolocation-API/
5. HTML Media Capture API: http://www(.)w3(.)org/TR/html-media-capture/
6. Contacts API: http://www(.)w3(.)org/TR/contacts-api/
7. The System Information API: http://www(.)w3(.)org/TR/system-info-api/
8. WebGL: https://www(.)khronos(.)org/registry/webgl/specs/latest/
9. HTTP State Management Mechanism, RFC 6265: http://tools.ietf(.)org/html/rfc6265

2. Speculative Event Mirroring

Prevention of Default Behavior

As discussed above, mirrored events are generated at the client browser generally in response to user interaction. The client application assigns a sequence number to each even and transmits a message to the Master about the event and sequence number. In many cases, the Master Browser will take some action in response to the event, either changing the DOM or other browser state information and if necessary send instructions back to the slave. However, for some events a default action of the browser is defined, not an action to an HTML element. According to specific embodiments, a Slave Browser performs one or more default browser actions immediately and then informs the Master Browser.

Web applications sometimes seek to prevent default browser behaviors in response to events and instead execute custom actions. For example, the default browser action for a mouse wheel event is to scroll the page in the direction of the wheel spin. As discussed above, these types of actions (scroll) may be allowed at a Slave Browser as they do not modify any elements in the slave DOM and generally are not specified in the DOM. A mapping application, however, may wish to suppress that behavior, and instead present a map with a different zoom level to the user. To achieve this, the web application will register a JavaScript event handler for the mouse wheel event. When invoked by the browser, the event handler will call the preventDefault method of the event object that is passed in as a parameter. This call signals to the browser that the default behavior normally associated with the mouse wheel event should not be executed, and the page will not be scrolled.

To address these issues, according to specific embodiments, a method for Speculative Event Execution in the context of DOM and Event Mirroring allows for highly-responsive behavior of the Slave Browser, while correcting for state inconsistencies that may occur as a result of default browser behavior prevention by the underlying web application. In the worst case scenario, Event Mirroring behavior characteristics approach those of traditional remote desktop systems, where every user interaction requires a network round trip before taking effect. In the best case scenario, no network lag affects the immediacy of user interactions with mirrored web content.

Consider the example sequence of mouse wheel actions in the context of DOM and Event Mirroring provided below. For example, where:
1. The user has navigated to a mapping web application, which has been loaded by Master Browser and mirrored to Slave Browser.
2. The user now spins the mouse wheel, generating a corresponding event in the Slave Browser.
3. Slave Browser's event handler gets invoked. Slave Browser sends information about the mouse wheel event to Master Browser. Being unaware of the custom web application logic, Slave Browser also executes the default scrolling action.
4. Master Browser receives the mouse wheel event information and replays the event. An event handler registered by the mapping web application is invoked, and calls the preventDefault method of the event object. The default browser action is prevented, and the web page is not scrolled.

At this point, the states of Master and Slave Browsers are out of sync (both the DOM perhaps, and state such as scroll position, which is generally not considered part of the DOM. The mirrored web page in Slave Browser has been scrolled, while the original in Master Browser has remained in place. Similar desynchronization can occur with other elements of web page state: text input control values, states of radio buttons, checkboxes, etc.

As discussed above, it is very beneficial from the usability standpoint, for Slave Browser to allow user interactions with web page content to take place immediately, without waiting for Master Browser to finish receiving and replaying the corresponding event information. However, the use of preventDefault function by the web application can result in desynchronized state between Slave and Master browsers. To solve this problem according to specific embodiments, Speculative Event Mirroring is used.

According to specific embodiments, user interaction events in the Slave Browser result in immediate execution of default browser actions. According to specific embodiments, both Slave and Master Browsers keep a history of events. All events are assigned unique identifiers, e.g., sequence numbers. If the preventDefault function is invoked by the event handler running in Master Browser and replaying the event sent by the Slave Browser, a message indicating preventDefault function was called on that sequence number event is sent to Slave Browser. This event becomes the divergence point between Master and Slave. Master Browser now enters into the recovery mode.

Once the Slave Browser receives information about the divergence point, it also enters into the recovery mode. In this mode, Slave Browser waits for the consequences of the divergence point event to finish executing, before requesting a list of corrective recovery actions from Master Browser. The wait for event consequences differs, depending on the type of divergence point event and associated targets. Examples according to specific embodiments are as follows:
  mousedown divergence point: Slave Browser will wait for mouseup and click events to follow, and track any input or change events on affected target elements.
  keydown divergence point: Slave Browser will wait for keypress and keyup events, followed by change, scroll, or input events on affected elements.

Figure 5:
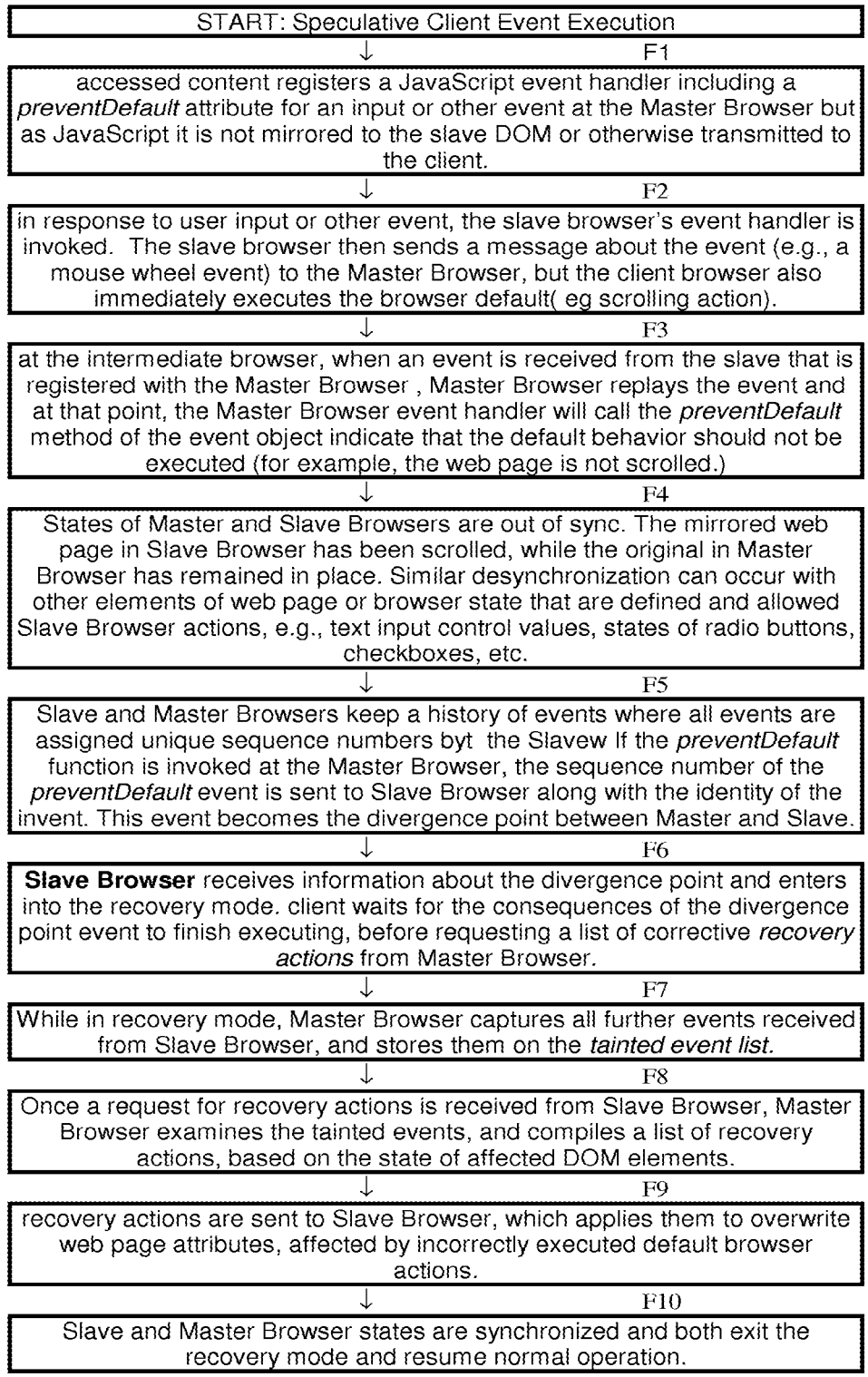
FIG. 5 is a flow chart illustrating speculative client event execution according to specific embodiments.

While in recovery mode, Master Browser captures all further events received from Slave Browser, and stores them on the tainted event list. Once a request for recovery actions is received from Slave Browser, Master Browser examines the tainted events, and compiles a list of recovery actions, based on the state of affected DOM elements. This state is correct on Master, but is assumed to be incorrect on Slave Browser. Recovery actions can include:
  scroll positions of elements
  text values of editable elements
  state of checkboxes, radio buttons, and select controls
  page element, currently in focus Once collected, the recovery actions are sent to Slave Browser, which applies them to overwrite web page attributes, affected by incorrectly executed default browser actions. At this point, the Slave and Master Browser states have been synchronized, after which both exit the recovery mode and resume normal operation. FIG. 5 is a flow chart illustrating speculative client event execution according to specific embodiments.

3. Zero Client-Install Remote Access to Restricted Content

Figure 10:
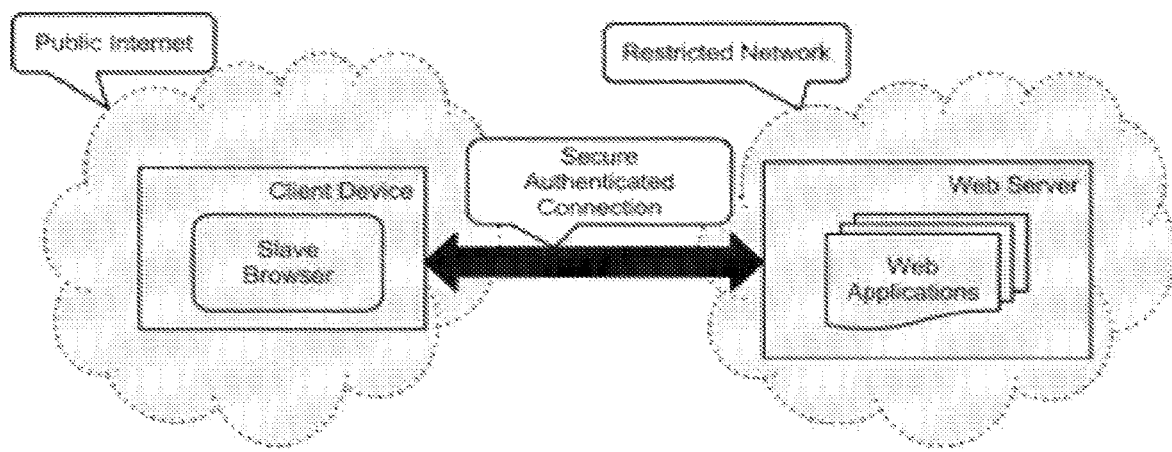
FIG. 10 illustrates shows a traditional web application deployment model, where web applications potentially with access to data from a restricted network are made available over a network, e.g., a private network or the public Internet.

According to further specific embodiments, a system and method of accessing web applications residing on a restricted computer network from a user's web browser executing outside of the restricted network is provided. This method has advantages over standard security methods. FIG. 10 illustrates shows a traditional web application deployment model, where web applications potentially with access to data from a restricted network are made available over a network, e.g., a private network or the public Internet. The system operates by executing a virtual or master web browser on a server. This virtual or Master Browser maintains a secure connection to the restricted network (e.g., over a VPN) and also a connection to a user's slave or client browser over the public network. Web pages and applications are executed in the virtual browser, with visual representation of the rendered content replicated in the user's Slave Browser through DOM mirroring as described above.

This method (at times referred to as Zero-Client-Install Remote Access) enables a user of a client device to access and interact with web applications on a restricted network without requiring installation of any remote access software like a VPN client or other software on the client device.

Figure 6:
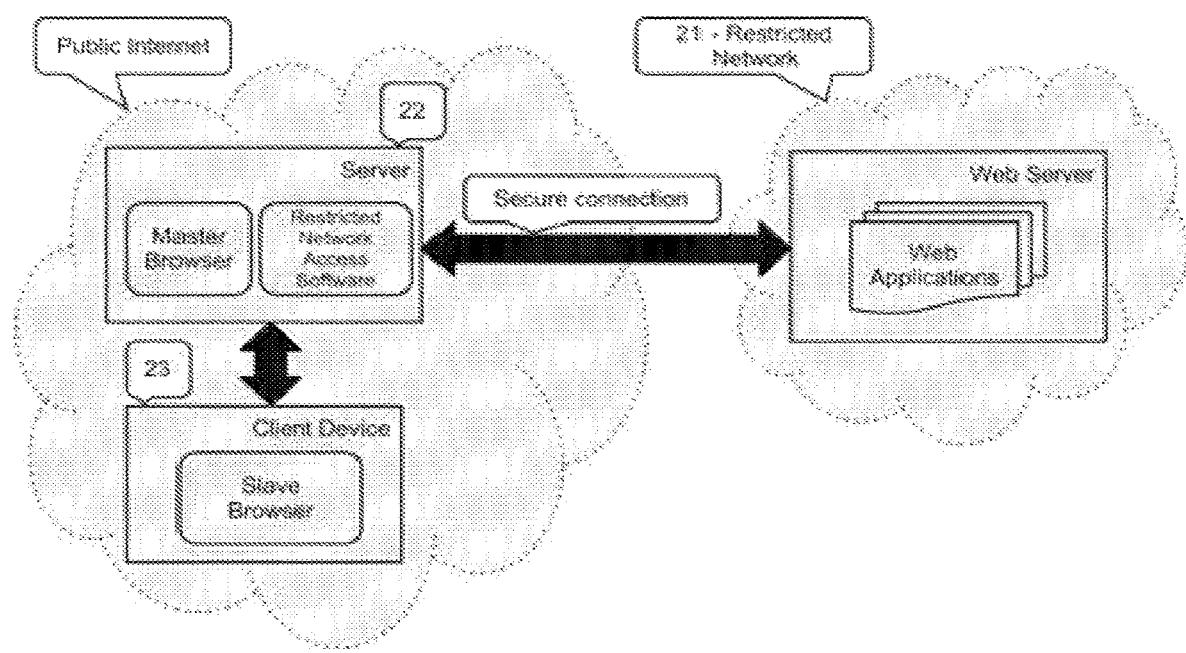
FIG. 6 illustrates a method of enhanced server based security that requires zero client install according to specific embodiments of the invention.

FIG. 6 illustrates a method of enhanced server based security that requires zero client install according to specific embodiments of the invention. FIG. 6 shows a restricted computer network, which is not accessible from the public Internet without additional security measures, such as a VPN connection and/or user authentication. 22 is a server computer, containing specialized software, necessary to establish a secure connection to the restricted computer network. The server contains the Master Browser software, as described herein. The Master Browser has access to and can execute web applications from the restricted computer network. The server is connected to the public Internet.

A client device 23 is connected to the public Internet, but not to the restricted network. The client computing device contains standard web browser software (e.g., a Slave Browser, as described herein) with support for HTTP and HTTPS network protocols, capable of rendering HTML documents, and executing associated scripts. No specialized remote access software is installed on the client device.

When a user of the client device wishes to access a web application on the restricted network, he/she directs a web browser on the device to the server (22). Server returns a specialized web application that will authenticate the user prior to permitting access to the restricted network. Once user identity is established, server (22) uses a secure connection to download and execute web applications from the restricted network. These web applications are projected into the Slave Browser on the user's device by using techniques of DOM and Event Mirroring described herein and generally using a Slave Browser.

Figure 7:
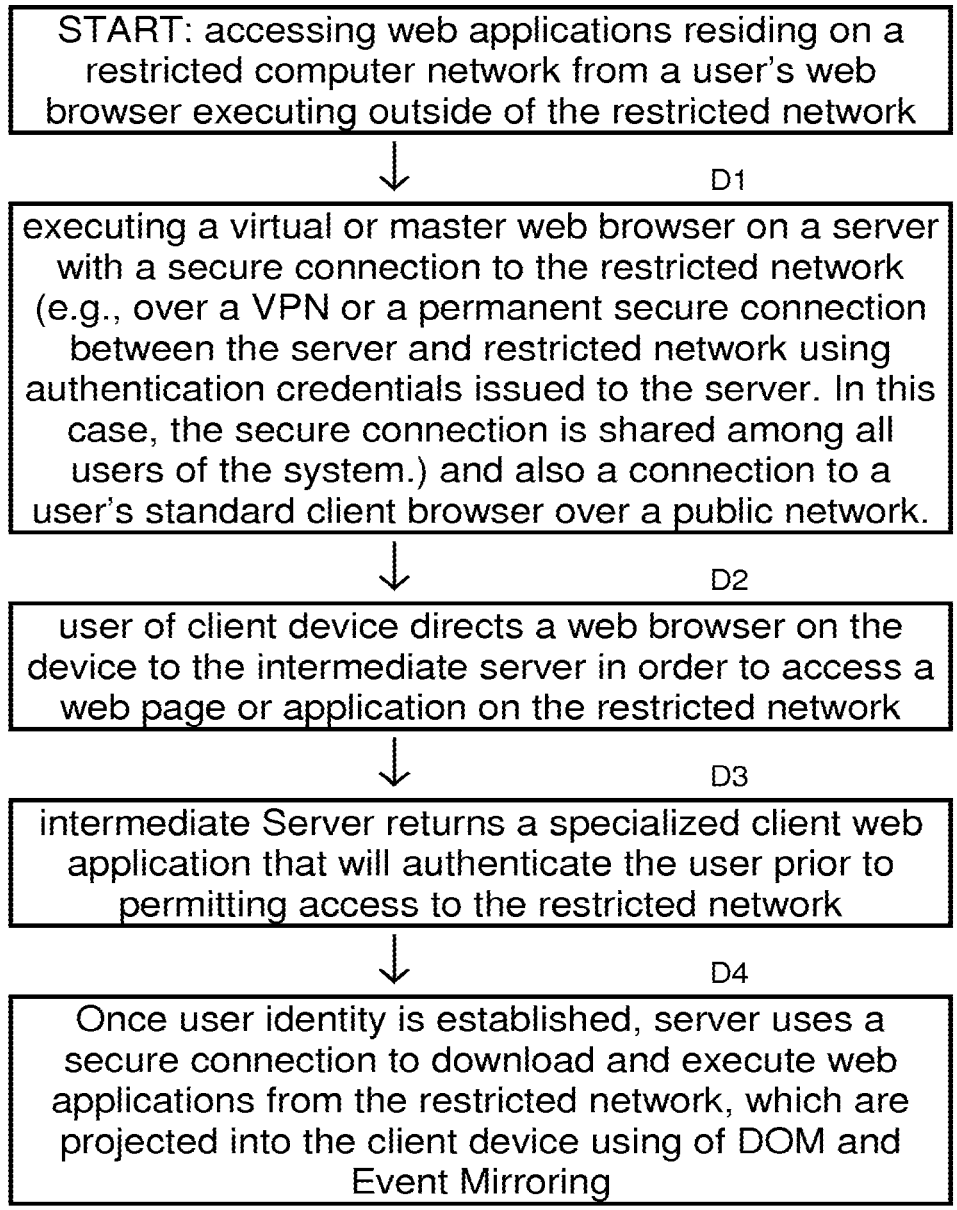
FIG. 7 is a flow chart illustrating no client install accessing of secure networks by external clients according to specific embodiments.

A second method of connecting to a restricted network involves establishing a permanent secure connection between the server (22) and restricted network (21), using authentication credentials issued to the server. In this case, the secure connection is shared among all users of the system. In other words, once the secure connection to the server is established, the server can service any number of clients using DOM mirroring as described herein. This method achieves efficiencies on the server by reducing VPN tunnel creation overhead, but does not affect the client. FIG. 7 is a flow chart illustrating no client install accessing of secure networks by external clients according to specific embodiments.

URL Rewriting for Restricted Access

Figure 8:
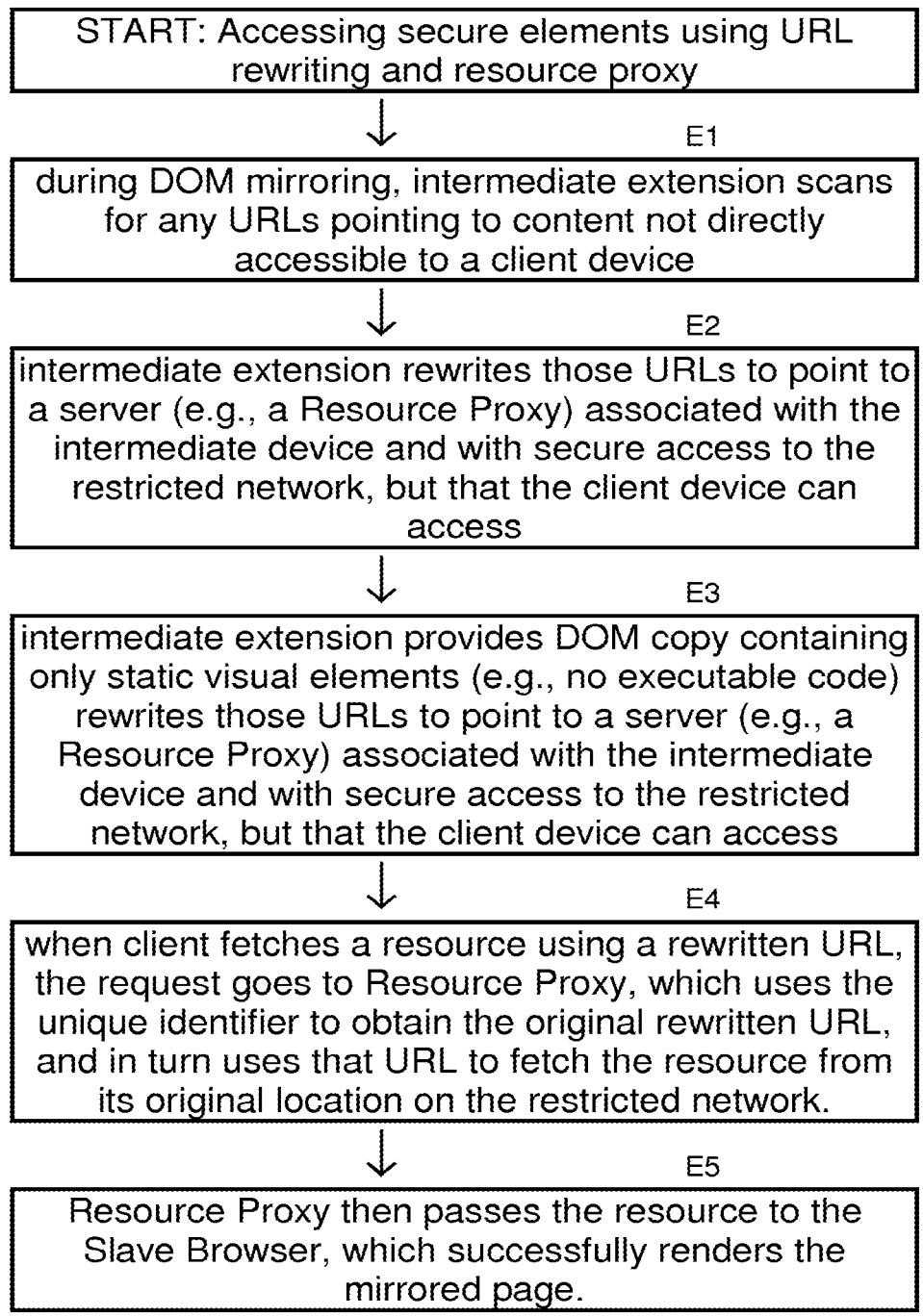
FIG. 8 is a flow chart illustrating URL rewriting at a client device according to specific embodiments.

FIG. 8 is a flow chart illustrating URL rewriting at a client device according to specific embodiments. Consider the case of web application resources in a remote access system based on DOM mirroring. HTML tags representing visual resources of the application may look as follows

```
<img src="http://restricted.example(.)org/image1.jpg "></img>
<audio><source src="http://restricted.example(.)org/song.mp3 "
type="audio/mp3" /></audio>
<video><source src="http://restricted.example(.)org/movie.mp4 "
type="video/mp4" /></video>
```

Figure 9:
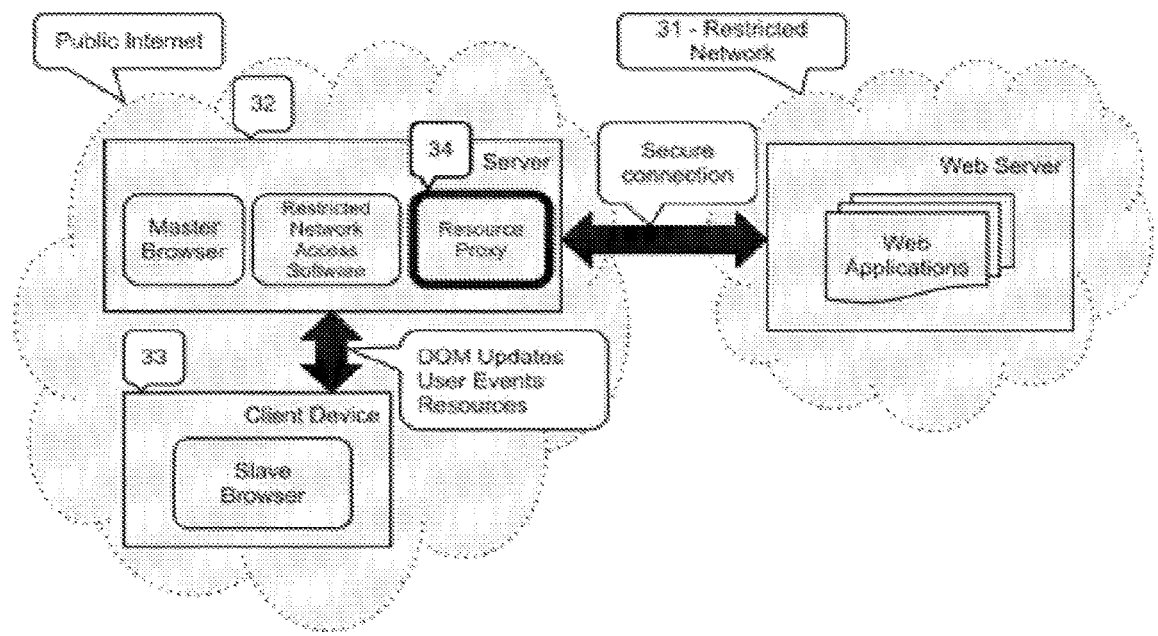
FIG. 9 is a block diagram illustrating example remote access with resource proxy according to specific embodiments.

If copied from the Master Browser's DOM to Slave Browser's DOM without modification, these page elements cannot be rendered by the Slave Browser, since the URLs point to locations on the restricted network, which is not directly accessible by Slave Browser. However, these resources are accessible to the server on which Master Browser is executing over a secure connection with the restricted network. To make these web application resources available to the Slave Browser, Master Browser includes an additional Resource Proxy component shown in FIG. 9. FIG. 9 is a block diagram illustrating example remote access with resource proxy according to specific embodiments. The Resource Proxy is employed in conjunction with a technique of URL Rewriting during DOM mirroring. URL Rewriting involves processing of the DOM in the Master Browser to identify all URLs referring to resources, and rewriting all such URLs to refer to the Resource Proxy before sending them to the Slave Browser's DOM. Rewritten URL follow the following format:

<Base URL of ResourceProxy><Uniqueidentifier>
where:
Base URL of Resource Proxy points to the network location of the Resource Proxy. For example: http://resource-proxy.example.com. This address is accessible to the Slave Browser.
Unique Identifier is generated based on the URL, being rewritten. When Slave Browser fetches a resource using a rewritten URL, the request goes to Resource Proxy, which uses the unique identifier to obtain the original rewritten URL, and in turn uses that URL to fetch the resource from its original location on the restricted network. Resource Proxy then passes the resource to the Slave Browser, which successfully renders the mirrored page. Since in general only static elements of the external web application or web page are sent to the Slave Browser and all JavaScript code of the web page or web application only executes in the Master Browser environment, URL rewriting according to specific embodiments is provably complete. In other words, with a Slave Browser executing a slave web application as described herein and with URL rewriting, it is guaranteed that the Slave Browser will not generate any URLs (e.g., through JavaScript) that have not be rewritten as described herein.

4. Data Leakage Prevention

According to further specific embodiments, a web page and web application mirroring technology such as discussed above can be used to prevent sensitive data leaks. Data Leakage Prevention (DLP) is a term that can be used to describe technologies designed to prevent or limit disclosure of sensitive information that are deployed by organizations that provide access to information on the public Internet. Generally, DLP is directed to preventing client browsers and devices from downloading particular information from a server, even if they have access to some of that information. Some servers, for example, may make a number of PDF files available for viewing from their website, but wish to prevent the downloading or printing of those PDF files by the client device. A typical web browsing scenario involves a web server and a browser on a client device. According to specific embodiments, to limit potential data leakage at the client device, an additional intermediate browser (e.g., a Master Browser as described above) is introduced. This intermediate browser, running on a server, acts as a safeguard for data received from the web server, only allowing a transient visual representation of the web page to reach the client. No modifications to web server or client browser are required to realize the data leakage prevention benefits of this technique. The client browser accesses the original web application through DOM mirroring as described herein, but no DNS change is required. Since the Master Browser has complete control over what goes to the Slave Browser (including which URLs are rewritten, and any data that's fetched through the rewritten URLs), the Master Browser can scrub/audit/redact any sensitive data that passes through.

While other security technologies, e.g., VPN, attempt to do URL rewriting and proxying for client devices, because of the nature of those services, when connected to web executable code (e.g., JavaScript) that code executes on the client device. Thus, VPN has to let JavaScript through to the client or disable it entirely. In this situation, the JavaScript can construct URLs that the VPN server is not able to rewrite.

According to specific embodiments, systems as described herein only run JavaScript or other executable code on the intermediate or Master Browser and do not allow that code on the slave. Flash generally is also not allowed on the Slave Browser as are no any dynamic web page elements. Because systems as described herein run JavaScript and other executable code in the master executable environment, the system can ensure that all URLs are rewritten before being fetched by the Slave Browser.

FIG. 10 illustrates shows a traditional web application deployment model, where web applications potentially with access to data from a restricted network are made available over a network, e.g., a private network or the public Internet. The connection between client device and web server may be secured with SSL. Prior to accessing sensitive data provided by the web applications, a user is required to authenticate themselves by a password or another authentication mechanism. According to specific embodiments, the slave application asks for authentication credentials before the master can connect to the restricted network. Slave collects credentials, Master presents them to the server that requires authentication. Once connected, the user can save and print HTML content of the web applications. If web applications include direct links to download non-HTML file types (documents, spreadsheets, presentations, images, etc.), in some instances one or more of those files can be saved and printed on the client device. Even in cases where "save" or "print" are "disabled" by a web server, slightly sophisticated users can often find a hidden direct link or use a browser add-or on other technique and still download the content.

According to specific embodiments, generally as a user is typing or providing mouse input, the slave application is mirroring to the master with then forwards to the Master Browser. Thus, according to specific embodiments, there is an input event for every character stroke. In general, a user input field, for example, is part of the DOM, but the value entered in it is not. Thus, scrolls, etc., radio buttons, etc., entered by a user at the slave device are sent up to the Master.

Save and print capabilities provided at the client device increase the likelihood of undesired data leakage, especially in case of where a physical device (e.g., a laptop, smart phone, or tablet) is lost or stolen. Industry-standard data leakage prevention measures used in traditional deployment model involve installation of software on both web server and client device to control the flow of sensitive data from the server, and prevent unintended disclosure of such data residing on the client device (e.g., documents, spreadsheets, presentations, images, etc.).

According to specific embodiments, a Master Browser and Slave Browser configured for DLP display content such as PDF documents, spreadsheets, etc. as pure HTML content (either using text or images). Thus whenever a user navigates to a document in one of the supported formats, only the visual representation of this document is shown in the Slave Browser. The original document is generally never available for download or copying at the client device.

According to specific embodiments, the Master Browser further provides the ability to dynamically insert watermarks into all content (web applications, documents, spreadsheets, presentations, images, etc.) sent to the Slave Browser. Specific document types which are subject to watermarking, and watermark content can be determined by system administrator. Some of the supported elements in a watermark include:

"CONFIDENTIAL", "RESTRICTED", "TOP-SECRET" stamps or similar;

User-identifying information (login name, e-mail address, employee ID) of the person accessing the document;

Time and location of access.

5. Sandboxing

Background

In computer security, sandboxing is a technique by which a running application is isolated from the rest of the system with the goal of preventing damage from possible malicious behavior exhibited by the application. The malicious behavior could be due to the application itself being authored by an attacker, or an attacker exploiting a flaw in an otherwise legitimate application to cause it to behave in a malicious way. In general, applications interact with the rest of the system through Application Program Interfaces (APIs). Sandboxing, thus can generally involve interception of API calls made by the application, examining information about the application making the call, the specified set of parameters, and other pertinent information to establish if the API call should be allowed to go forward.

Figure 11:
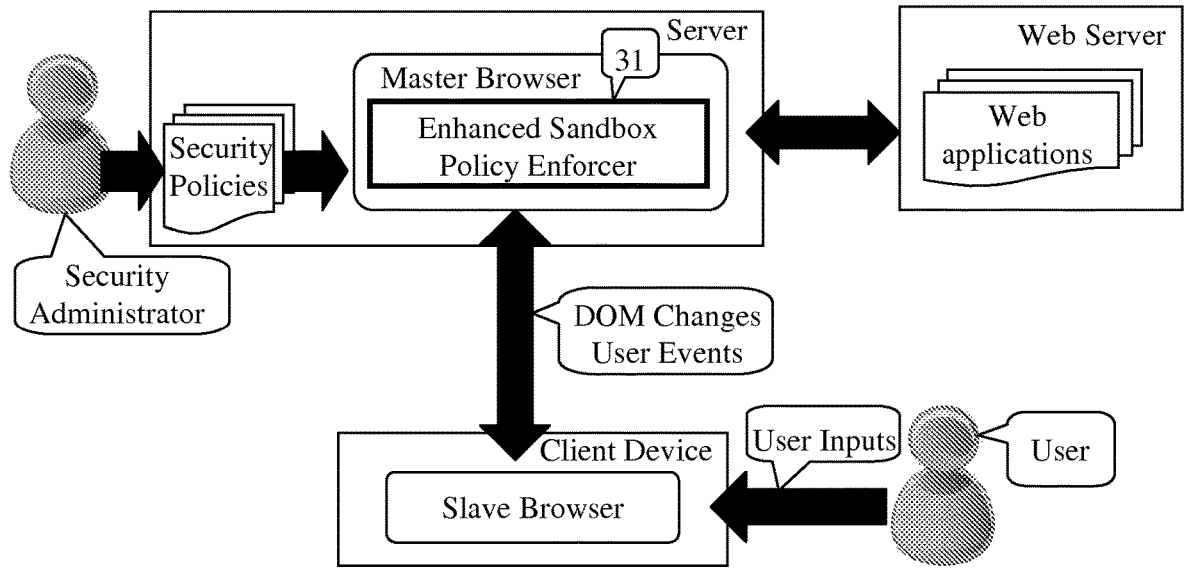
FIG. 11 is a block diagram illustrating web application sandboxing according to specific embodiments.
Figure 12:
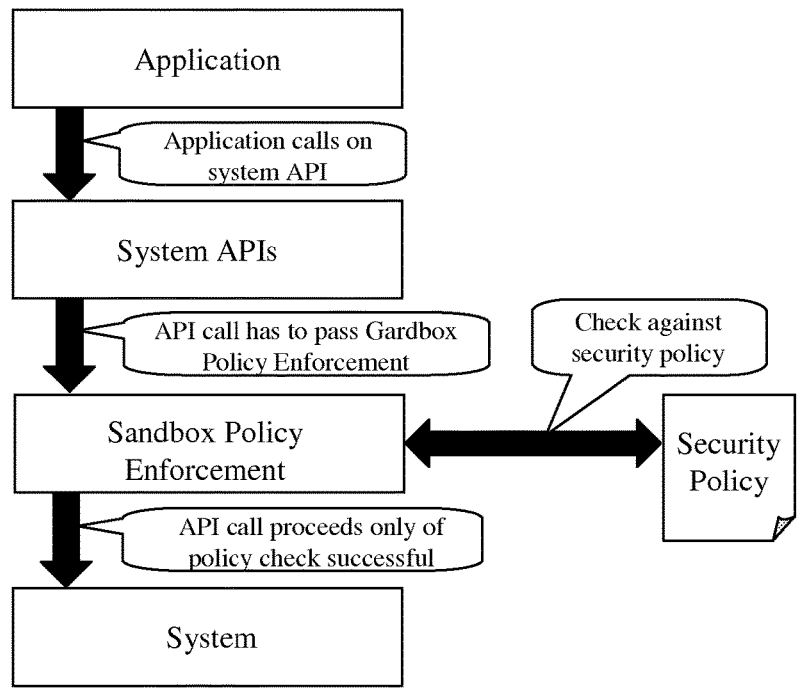
FIG. 12 is a flow diagram illustrating sandboxing policy enforcement according to specific embodiments of the present invention.

FIG. 11 is a block diagram illustrating web application sandboxing according to specific embodiments. This technique is based on DOM and event mirroring described above, where the Master executes web applications and projects visual representation to the client system. A master according to specific embodiments is modified to include an enhanced sandbox policy enforcer (ESPE) module 31 able to do one or more of (1) Use externally-provided security policies. External policies are provided by a human or computer-automated security administrator. (2) Dynamically compute an effective security policy from multiple sources. (3) Use attributes of the web application and runtime environment (see Table 1 for complete listing) to determine which access control rules from the security policy to apply. (4) Enforce access control restrictions on web browser functions that include one or more of: a. All functions that can be controlled by security policies of an unmodified web browser; b. All functions that can be controller by a Content Security Policy; c. An additional list of functions provided in Table 2.

TABLE 1

Attributes, Affecting Access Control Decisions

| Attribute | Description |
|---|---|
| URL of the web application | Examine protocol scheme, domain name, or the entire URL |
| URL category | Use an externally-provided database of URL categories to establish whether the URL belongs to a known category, e.g. Entertainment, Government, Education, Adult Material, etc. |
| SSL status of the connection | Examine the state of the SSL connection. Determine if the certificate of the site serving the web application is valid, invalid, expired, revoked, is an EVSSL certificate. Examine the Certificate Authority the signed the certificate. |
| Geographical Location of the client device, running the Slave Browser. | The Slave Browser retrieves the physical location of the client device (if available) and sends it to the Master Browser. ESPE uses that information to make access control decisions. |
| Date and Time | |

TABLE 2

Additional Browser Functions Controlled
By Enhanced Sandbox Policy Enforcer

| Browser Function | Restrictions |
| --- | --- |
| Telephony API | Control numbers to which outgoing calls can be made and incoming calls are accepted Limit area/country codes to which calls can be made |
| HTML 'input' element of type 'file' | Enable/disable feature. Control file types, which can be exchanged with the server. |
| Web Storage API [3] | Enable/disable access to API |
| File System API [4] | Enable/disable access to API |
| Indexed Database APT [5] | Enable/disable access to API Restrict transaction modes to READ_ONLY and VERSION_CHANGE |
| Geolocation API [6] | Enable/disable access to API |
| HTML Media Capture API [7] | Enable/disable access to API |
| Contacts API [8] | Enable/disable access to API Allow read-only access to API |
| The System Information API [9] | Enable/disable access to API Restrict access only to specific parts of system information (e.g. network status) |
| WebGL API | Enable/disable access to API |

REFERENCES

1 Same Origin Policy: http://www(.)w3(.)org/Security/wiki/Same_Origin_Policy
2 Content Security Policy: http://www(.)w3(.)org/TR/CSP/
3 Web Storage API: http://dev.w3(.)org/html5/webstorage/
4 System API: http://www(.)w3(.)org/TR/file-system-api/
5 Indexed Database API: http://www(.)w3(.)org/TR/IndexedDB/
6 Geolocation API: http://www(.)w3(.)org/TR/geolocation-API/
7 HTML Media Capture API: http://www(.)w3(.)org/TR/html-media-capture/
8 API: http://www(.)w3(.)org/TR/contacts-api/
9 The System Information API: http://www(.)w3(.)org/TR/system-info-api/
10 WebGL: https://www(.)khronos(.)org/registry/webgl/specs/latest/

Figure 13B:
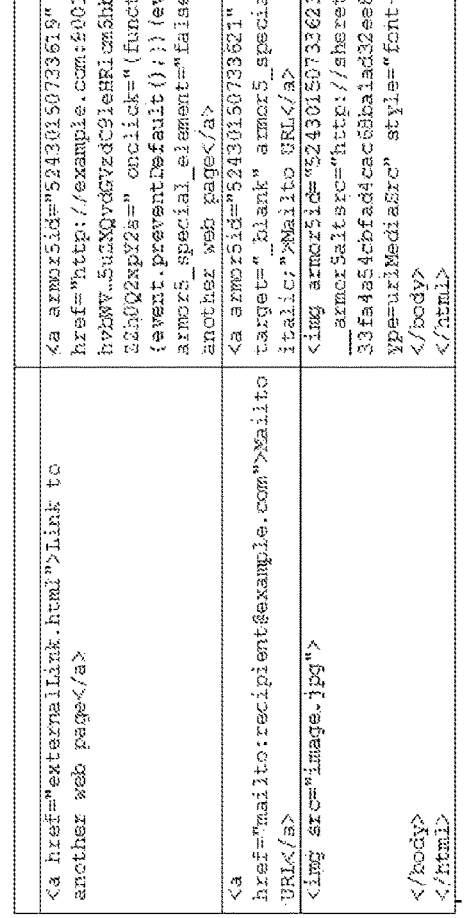

FIG. 13AB is a table showing one specific example of some of the modifications made to the mirrored model according to specific embodiments of the present invention. FIG. 13*is* provided as a specific example only to provide information regarding some aspects of enhanced DOM mirroring.

Embodiment in a Programmed Information Appliance

Figure 14:
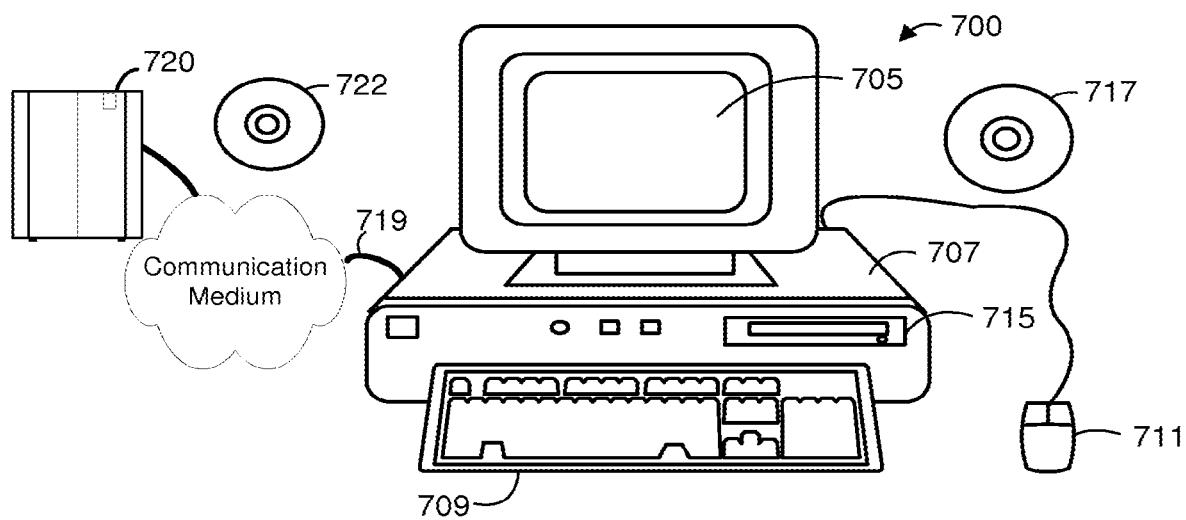
FIG. 14 is a block diagram showing a representative example logic device in which various aspects of the present invention may be embodied.

FIG. 14 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a user accesses through a communication medium in order to download a program component.

FIG. 14 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection. Any use of "computer" or "computer system" as described in this document should be understood to encompass any configuration of logical processing devices or systems, including hand-help computers, server computers, systems comprising many cooperating computers, etc.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

Other Embodiments

Specific embodiments according to one or more descriptions of invention(s) disclosed here have been described. Any use of the term invention or "the invention" shall be understood to encompass one or more specific embodiments of the invention, but not necessarily all embodiments. The attached claims shall be used as the primary reference to determining the scope of the invention(s) taught herein. Other embodiments will be apparent to those of skill in the art.

What is claimed:

1. A method, comprising:
    establishing, by a first browser executing on a device intermediary to a client and a server, a first model of content received from the server on the first browser;
    transmitting, by the first browser, a message of the first model to a second browser executing on the client for establishing or updating a second model of the content on the second browser at the client for creating a mirrored copy of the first model on the device as the second model on the client;
    applying, by the first browser, based on an event identifier received from the second browser, a security policy to a modification of the first model of the content, the event identifier corresponding to a user interaction with the content on the second browser at the client; and
    determining, by the first browser according to the security policy applied to the modification of the first model based on the event identifier corresponding to the user interaction, whether to allow the second model on the second browser at the client to be modified.

2. The method of claim 1, wherein applying the modification to the first model comprises applying the modification to the first model prior to allowing a modification to the second model corresponding to the user interaction.

3. The method of claim 1, further comprising specifying, by the first browser according to the security policy, a modification to the second model.

4. The method of claim 3, wherein the modification to the second model is different from the modification to the first model.

5. The method of claim 1, wherein if the user interaction comprises a user interaction that does not affect the second model, the second browser is configured to respond directly to the user interaction.

6. The method of claim 1, further comprising:
modifying, by a web application of the first browser, a cookie store in the device by at least one of setting a new cookie, removing an existing cookie, and modifying a cookie value;
formatting, by the web application, information about the modified cookie store into a message; and
sending, by the web application, the message to the second browser.

7. The method of claim 1, further comprising:
registering, by the first browser, an event handler including a preventDefault attribute; and
preventing, by the first browser, transmission of data from the event handler to the second browser.

8. The method of claim 7, further comprising executing, by the first browser, the user interaction using the event identifier received from the second browser to determine if the user interaction is a registered event.

9. The method of claim 8, further comprising determining, by the first browser, responsive to determining that the user interaction is a registered event, that a corresponding default action should not be executed.

10. The method of claim 1, further comprising transmitting, by the first browser, a divergence indicator to the second browser, wherein the divergence indicator identifies a divergence in processing of the user interaction between the first browser and the second browser.

11. A system, comprising:
a device intermediary to a client and a server, the device comprising circuitry for executing a first browser, the first browser configured to:
establish, on the first browser, a first model of content received from the server;
transmit a message of the first model to a second browser executing on the client for establishing or updating a second model of the content on the second browser at the client for creating a mirrored copy of the first model on the device as the second model on the client;
apply, based on an event identifier received from the second browser on the client, a security policy to a modification of the first model of the content, the event identifier corresponding to a user interaction with the content on the second browser at the client; and
determine, according to the security policy applied to the modification of the first model based on the event identifier corresponding to the user interaction, whether to allow the second model on the second browser at the client to be modified.

12. The system of claim 11, wherein the first browser is configured to apply the modification to the first model prior to allowing a modification to the second model corresponding to the user interaction.

13. The system of claim 11, wherein the first browser is further configured to specify a modification to the second model according to the security policy.

14. The system of claim 13, wherein the modification to the second model is different from the modification to the first model.

15. The system of claim 11, wherein if the user interaction comprises a user interaction that does not affect the second model, the second browser is configured to respond directly to the user interaction.

16. The system of claim 11, further comprising a web application executing on the device, the web application configured to
modify a cookie store in the device by at least one of setting a new cookie, removing an existing cookie, and modifying a cookie value;
format information about the modified cookie store into a message; and
send the message to the second browser.

17. The system of claim 11, wherein the first browser is further configured to register an event handler including a preventDefault attribute, and prevent transmission of data from the event handler to the second browser.

18. The system of claim 17, wherein the first browser is further configured to execute the user interaction using the event identifier received from the second browser to determine if the user interaction is a registered event.

19. The system of claim 18, wherein the first browser is further configured to determine, responsive to determining that the user interaction is a registered event, that a corresponding default action should not be executed.

20. The system of claim 11, wherein the first browser is further configured to transmit a divergence indicator to the second browser, wherein the divergence indicator identifies a divergence in processing of the user interaction between the first browser and the second browser.

* * * * *